(12) United States Patent
Chiproot

(10) Patent No.: US 9,816,649 B2
(45) Date of Patent: Nov. 14, 2017

(54) FOLDABLE SEAL FOR RANGE OF PIPE DIAMETERS

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 79 days.

(21) Appl. No.: 14/833,254

(22) Filed: Aug. 24, 2015

(65) Prior Publication Data

US 2017/0059070 A1  Mar. 2, 2017

(51) Int. Cl.
| F16L 25/12 | (2006.01) |
| F16L 25/06 | (2006.01) |
| F16L 21/02 | (2006.01) |
| F16L 21/06 | (2006.01) |
| F16L 25/14 | (2006.01) |

(52) U.S. Cl.
CPC .......... *F16L 25/065* (2013.01); *F16L 21/022* (2013.01); *F16L 21/065* (2013.01); *F16L 25/12* (2013.01); *F16L 25/14* (2013.01)

(58) Field of Classification Search
CPC ..................................................... F16L 25/12
USPC ............................ 285/12, 110, 111, 112, 369
See application file for complete search history.

(56) References Cited

U.S. PATENT DOCUMENTS

| 4,487,421 A | * | 12/1984 | Housas | ................. F16L 17/035 285/110 |
| 5,624,123 A | * | 4/1997 | Meyers | ..................... F16L 5/10 285/4 |
| 5,711,536 A | * | 1/1998 | Meyers | ..................... F16L 5/10 285/4 |
| 6,293,556 B1 | * | 9/2001 | Krausz | .................... F16L 25/14 285/110 |
| 7,243,955 B2 | * | 7/2007 | Krausz | .................... F16L 21/08 285/111 |
| 7,654,586 B2 | * | 2/2010 | Krausz | ................. F16L 21/022 285/111 |
| 7,997,626 B2 | * | 8/2011 | Krausz | ................. F16L 21/022 285/110 |

(Continued)

FOREIGN PATENT DOCUMENTS

EP  1862722  12/2007

OTHER PUBLICATIONS

PCT Search Report and Written Opinion PCT/IB2016/054973, dated Nov. 18, 2016, received Jan. 12, 2017.

*Primary Examiner* — David E Bochna
(74) *Attorney, Agent, or Firm* — Dekel Patent Ltd.; David Klein

(57) ABSTRACT

A pipe coupling includes a clamp housing including at least one end having two opposing clamp members and one or more tightening elements for tightening the clamp members towards each other in a direction transverse to an axial length of the clamp housing so as to apply a radially-inward clamping force on a pipe being clamped in the clamp housing. An at least partially annular seal is mounted in the at least one end of the clamp housing. The seal has a folded-inwards configuration in which a foldable portion of the seal is folded inwards to create a first inner diameter, and a folded-outwards configuration in which the foldable portion of the seal is unfolded outwards to create a second inner diameter larger than the first inner diameter.

6 Claims, 2 Drawing Sheets

(56) References Cited

U.S. PATENT DOCUMENTS

| | | | |
|---|---|---|---|
| 8,528,945 B2* | 9/2013 | Bird | F16L 25/14 285/110 |
| 8,776,351 B2* | 7/2014 | Bird | F16L 21/065 285/369 |
| 8,960,683 B2* | 2/2015 | Krausz | F16L 25/14 277/605 |
| 9,310,002 B2* | 4/2016 | Chiproot | F16L 17/10 |
| 2011/0031737 A1 | 2/2011 | Krausz | |
| 2013/0154259 A1 | 6/2013 | Chiproot | |

* cited by examiner

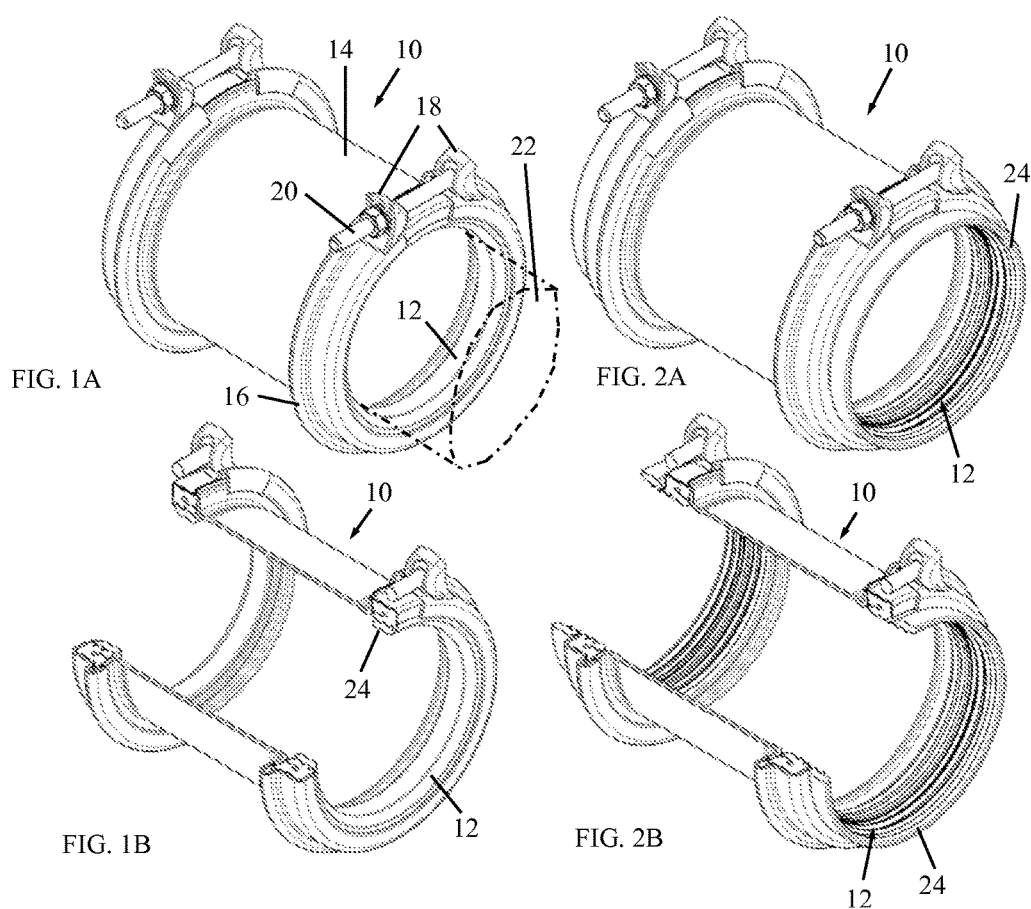

… (1)

FOLDABLE SEAL FOR RANGE OF PIPE DIAMETERS

FIELD OF THE INVENTION

The present invention relates generally to couplings (or clamps) and grip rings for pipes, and particularly to a seal for a coupling that when folded inwards seals against a pipe of a first diameter and when folded outwards seals against a pipe of a second, larger diameter.

BACKGROUND OF THE INVENTION

Many kinds of removable band-type couplings for pipes exist in the art. It is noted that throughout the specification and claims, the term "pipe" encompasses any kind of generally cylindrical object.

Such couplings have an elastomeric seal assembly which is tightened to form a watertight seal against the pipe. Couplings are known that can be used for a range of pipe diameters. Generally, such seal assemblies have two layers of gaskets (seals), for example, constructed of a first ring seal seated over a second ring seal. The seals can be easily disconnected from one another to allow sealing against different diameter pipes. For smaller diameter pipes, both the first and second ring seals are used; for larger diameters, only one seal is used.

SUMMARY OF THE INVENTION

The present invention seeks to provide an improved seal assembly, as is described more in detail hereinbelow. Unlike the prior art, the seal assembly of the present invention when folded inwards seals against a pipe of a first diameter and when folded outwards seals against a pipe of a second, larger diameter, thereby compensating the difference in diameters of the pipes with a single sealing ring.

There is thus provided in accordance with an embodiment of the present invention a pipe coupling including a clamp housing including at least one end having two opposing clamp members and one or more tightening elements for tightening the clamp members towards each other in a direction transverse to an axial length of the clamp housing so as to apply a radially-inward clamping force on a pipe being clamped in the clamp housing, and an at least partially annular seal mounted in the at least one end of the clamp housing, the seal having a folded-inwards configuration in which a foldable portion of the seal is folded inwards to create a first inner diameter, and a folded-outwards configuration in which the foldable portion of the seal is unfolded outwards to create a second inner diameter larger than the first inner diameter.

In accordance with an embodiment of the present invention the foldable portion is located at an axial end of the seal.

In accordance with an embodiment of the present invention, in the folded-inwards configuration, the foldable portion is folded against another portion of the seal which is radially offset from the foldable portion.

In accordance with an embodiment of the present invention the foldable portion and the other portion of the seal include mating portions (e.g., at least partially annular ridges and grooves) which mate with each other in the folded-inwards configuration.

In accordance with an embodiment of the present invention the other portion of the seal is constructed with an outer member folded over an inner member so as to define at least one inner annular space between and bounded by the inner and outer members.

In accordance with an embodiment of the present invention, in the folded-inwards configuration, there are surfaces of the foldable portion and the other portion of the seal that do not mate with each other but instead are separated from each other by a gap, and the gap is in fluid communication with the mating portions. The gap may be used for inserting fingers to grip and move the foldable portion of the seal.

BRIEF DESCRIPTION OF THE DRAWINGS

The present invention will be understood and appreciated more fully from the following detailed description, taken in conjunction with the drawing in which:

FIGS. 1A and 1B are simplified pictorial and partially cutaway illustrations, respectively, of a pipe coupling with a seal, constructed and operative in accordance with a non-limiting embodiment of the present invention, wherein the seal is in a folded-inwards configuration;

FIGS. 2A and 2B are simplified pictorial and partially cutaway illustrations, respectively, of the pipe coupling, wherein the seal is in a folded-outwards configuration;

DETAILED DESCRIPTION OF EMBODIMENTS

Figure 3A:
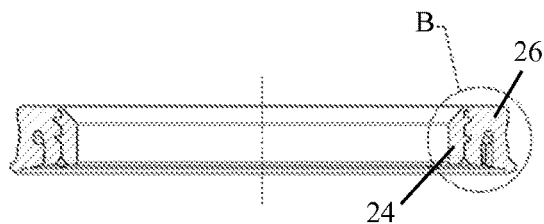
FIGS. 3A and 3B are simplified sectional and enlarged sectional illustrations, respectively, of the seal in the folded-inwards configuration.
Figure 4A:
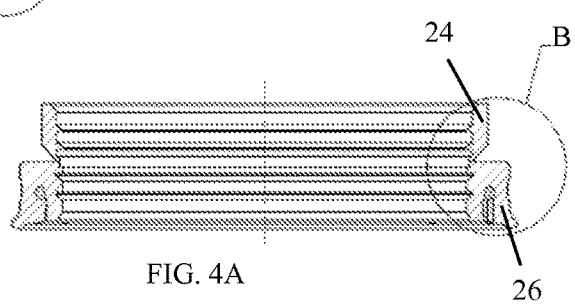
FIGS. 4A and 4B are simplified sectional and enlarged sectional illustrations, respectively, of the seal in the folded-outwards configuration.

Reference is now made to FIGS. 1A and 1B, which illustrate a pipe coupling 10 with a seal 12, constructed and operative in accordance with a non-limiting embodiment of the present invention.

Pipe coupling 10 includes clamp housing 14 that has one or more ends 16 (two are shown in the illustrated embodiment). Clamp housing 14 may be cylindrical or partially cylindrical or of any other shape. End 16 is provided with two opposing clamp members 18 and one or more tightening elements 20 for tightening the clamp members 18 towards each other in a direction transverse to an axial length of the clamp housing 14 so as to apply a radially-inward clamping force on a pipe 22 (shown partially in broken lines in FIG. 1A) being clamped in the clamp housing 14.

Seal 12 is an at least partially annular seal, meaning it can be a full 360° sealing ring or it can be a partial ring spanning an angle less than 360°, depending on the particular application. Seal 12 is mounted in end 16 of clamp housing 14. In FIGS. 1A-1B, seal 12 is in a folded-inwards configuration in which a foldable portion 24 (FIG. 1B) of seal 12 is folded inwards to create a first inner diameter. In FIGS. 2A-2B, seal 12 is in a folded-outwards configuration in which the foldable portion 24 is unfolded outwards to create a second inner diameter larger than the first inner diameter.

Seal 12, without limitation, may be made of a rubber (e.g., EPDM (ethylene propylene diene monomer), butyl, styrene butadiene or neoprene) or a thermoplastic elastomer (e.g., polyurethane or olefin) compatible with the fluid to be carried in the pipe. For example, without limitation, seal 12 may be made of EPDM rubber with 70-80 Shore A durometer.

In one embodiment, foldable portion 24 is located at an axial end of seal 12 but may be located at other places on the seal.

Figure 3B:
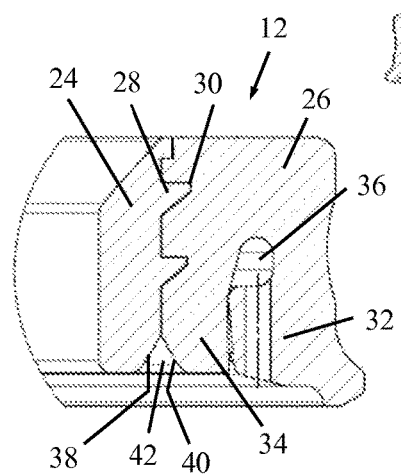
Figure 4B:
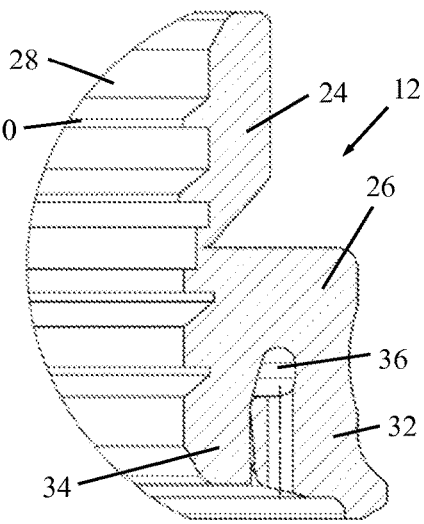

Reference is now made to FIGS. 3A-3B. In accordance with an embodiment of the present invention, in the folded-inwards configuration, foldable portion 24 is folded against another portion 26 of seal 12 which is radially offset from foldable portion 24 (e.g., portion 26 is illustrated as radially outwards of foldable portion 24, but may be radially inwards instead). The foldable portion 24 and the other portion 26 may include mating portions which mate with each other in the folded-inwards configuration. For example, the mating portion may include at least partially annular ridges 28 and at least partially annular grooves 30. The mating portions help maintain the foldable portion 24 in place when in the folded-inwards configuration.

The foldable portion 24 may be hingedly attached to the other portion 26 of seal 12. Portions 24 and 26 may be a one-piece construction, or alternatively, foldable portion 24 may be joined to the other portion 26, such as by bonding, mechanical fastening or any other suitable method.

In the illustrated embodiment, the other portion 26 of seal 12 is constructed with an outer member 32 folded over an inner member 34 so as to define at least one inner annular space 36 between and bounded by the inner and outer members 34 and 32. As is known in the art, any fluid that enters the inner annular space 36 (such as via apertures formed in a side wall of the seal, not shown) applies pressure in inner annular space 36 to increase tightening of the seal 12 against the pipe.

In the illustrated embodiment, as seen in the folded-inwards configuration of FIG. 3B, there are surfaces 38 and 40 of the foldable portion and the other portion of the seal, respectively, that do not mate with each other but instead are separated from each other by a gap 42. Gap 42 is in fluid communication with the mating portions, thereby permitting fluid to flow to the mating portions and apply pressure in the mating portions to create hydraulic pressure to increase tightening of the seal 12 against the pipe. The gap may be used for inserting fingers to grip and move the foldable portion of the seal.

What is claimed is:

1. A pipe coupling comprising:
   a clamp housing comprising at least one end having two opposing clamp members and one or more tightening elements for tightening said clamp members towards each other in a direction transverse to an axial length of said clamp housing so as to apply a radially-inward clamping force on a pipe being clamped in said clamp housing; and
   an at least partially annular seal mounted in said at least one end of said clamp housing, said seal having a folded-inwards configuration in which a foldable portion of said seal is folded inwards to create a first inner diameter, and a folded-outwards configuration in which said foldable portion of said seal is unfolded outwards to create a second inner diameter larger than said first inner diameter, and wherein in said folded-inwards configuration, said foldable portion is folded against another portion of the seal which is radially offset from said foldable portion.

2. The pipe coupling according to claim 1, wherein said foldable portion is located at an axial end of said seal.

3. The pipe coupling according to claim 1, wherein said foldable portion and said other portion of the seal comprise mating portions which mate with each other in said folded-inwards configuration.

4. The pipe coupling according to claim 3, wherein said mating portions comprise mating at least partially annular ridges and at least partially annular grooves.

5. The pipe coupling according to claim 3, wherein in said folded-inwards configuration there are surfaces of said foldable portion and said other portion of the seal that do not mate with each other but instead are separated from each other by a gap, and said gap is arranged with respect to said mating portions such that fluid is flowable between said gap and said mating portions.

6. The pipe coupling according to claim 1, wherein said other portion of the seal is constructed with an outer member folded over an inner member so as to define at least one inner annular space between and bounded by said inner and outer members.

* * * * *